Aug. 2, 1966  E. W. CARMICHAEL ETAL  3,263,718
METHOD AND APPARATUS FOR MANUFACTURING DOOR FRAME COMPONENTS
Filed April 23, 1964  7 Sheets-Sheet 1
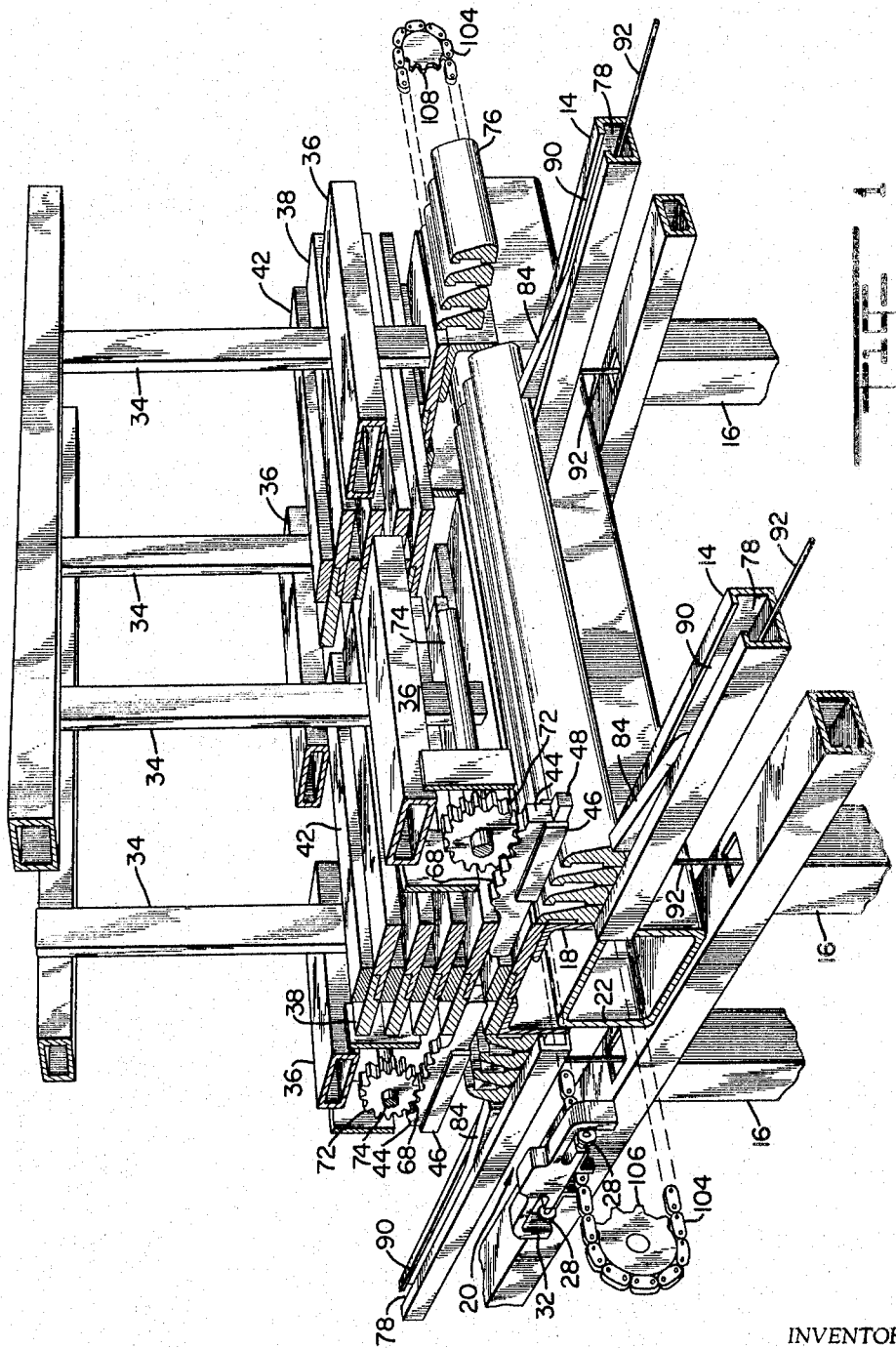
INVENTORS
ELDON W. CARMICHAEL
JAMES C. WRIGHT
BY
*Sheridan and Ross*
ATTORNEYS Aug. 2, 1966    E. W. CARMICHAEL ETAL    3,263,718
METHOD AND APPARATUS FOR MANUFACTURING DOOR FRAME COMPONENTS
Filed April 23, 1964    7 Sheets-Sheet 3
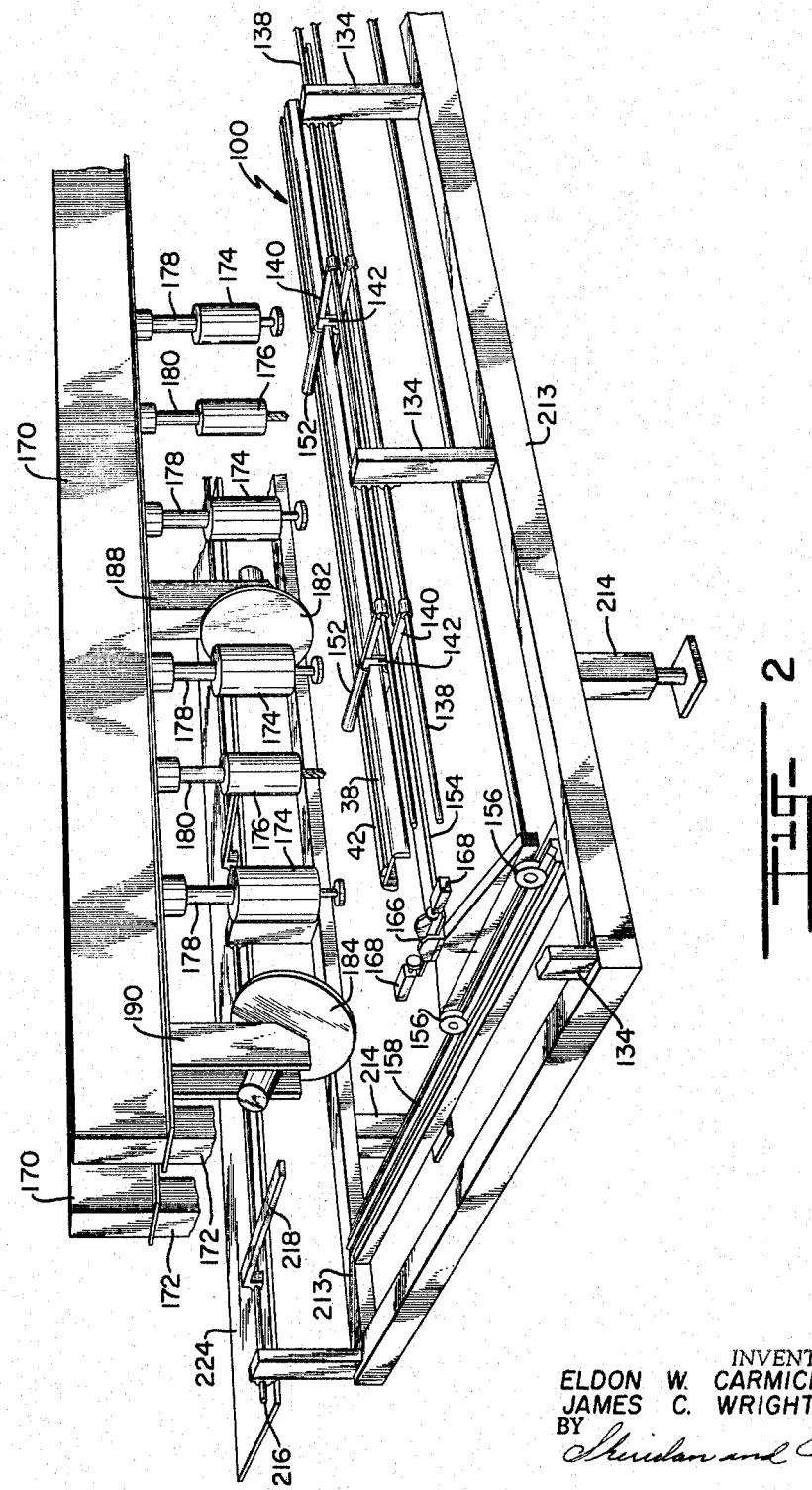
INVENTORS
ELDON W. CARMICHAEL
JAMES C. WRIGHT
BY Sheridan and Ross
ATTORNEYS

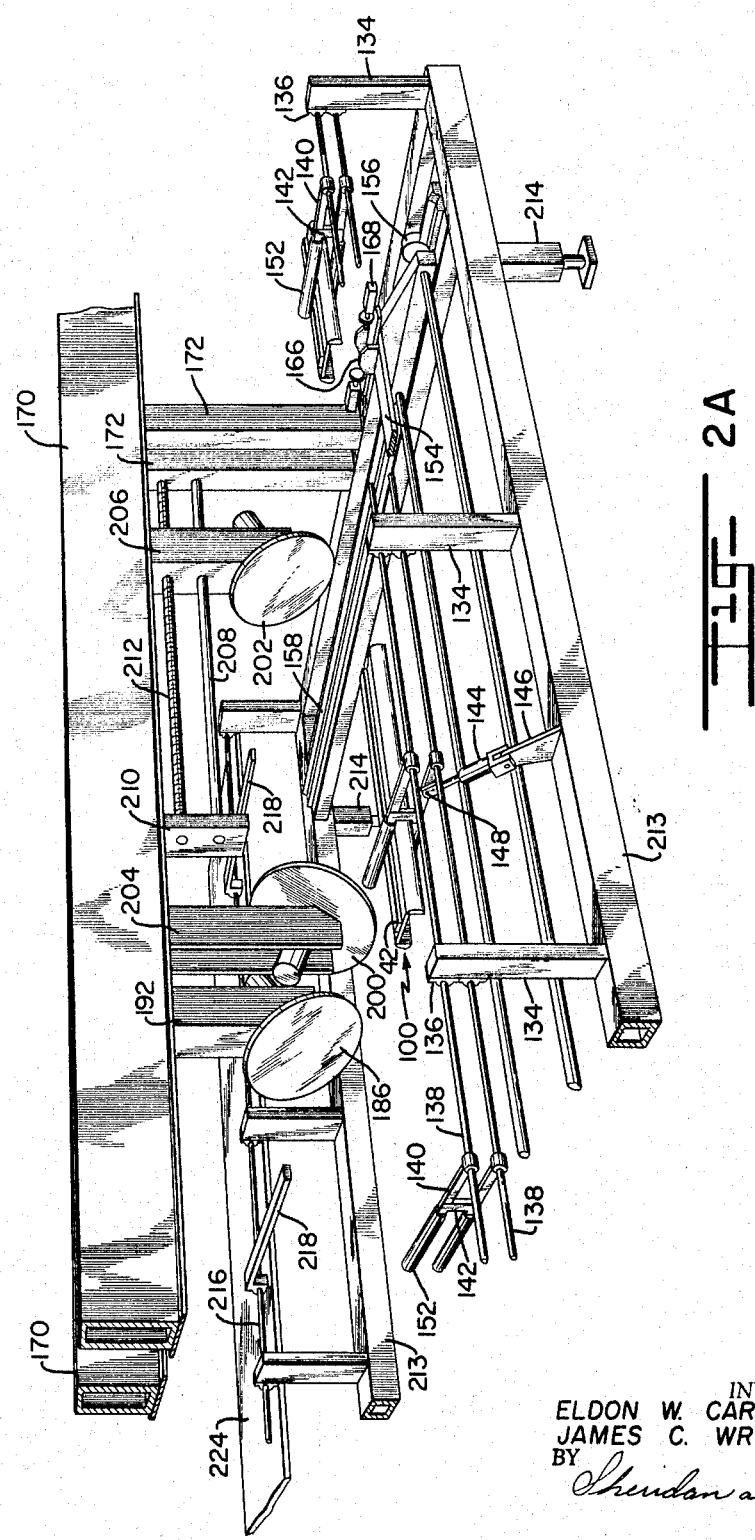

Aug. 2, 1966     E. W. CARMICHAEL ETAL     3,263,718
METHOD AND APPARATUS FOR MANUFACTURING DOOR FRAME COMPONENTS
Filed April 23, 1964     7 Sheets-Sheet 5
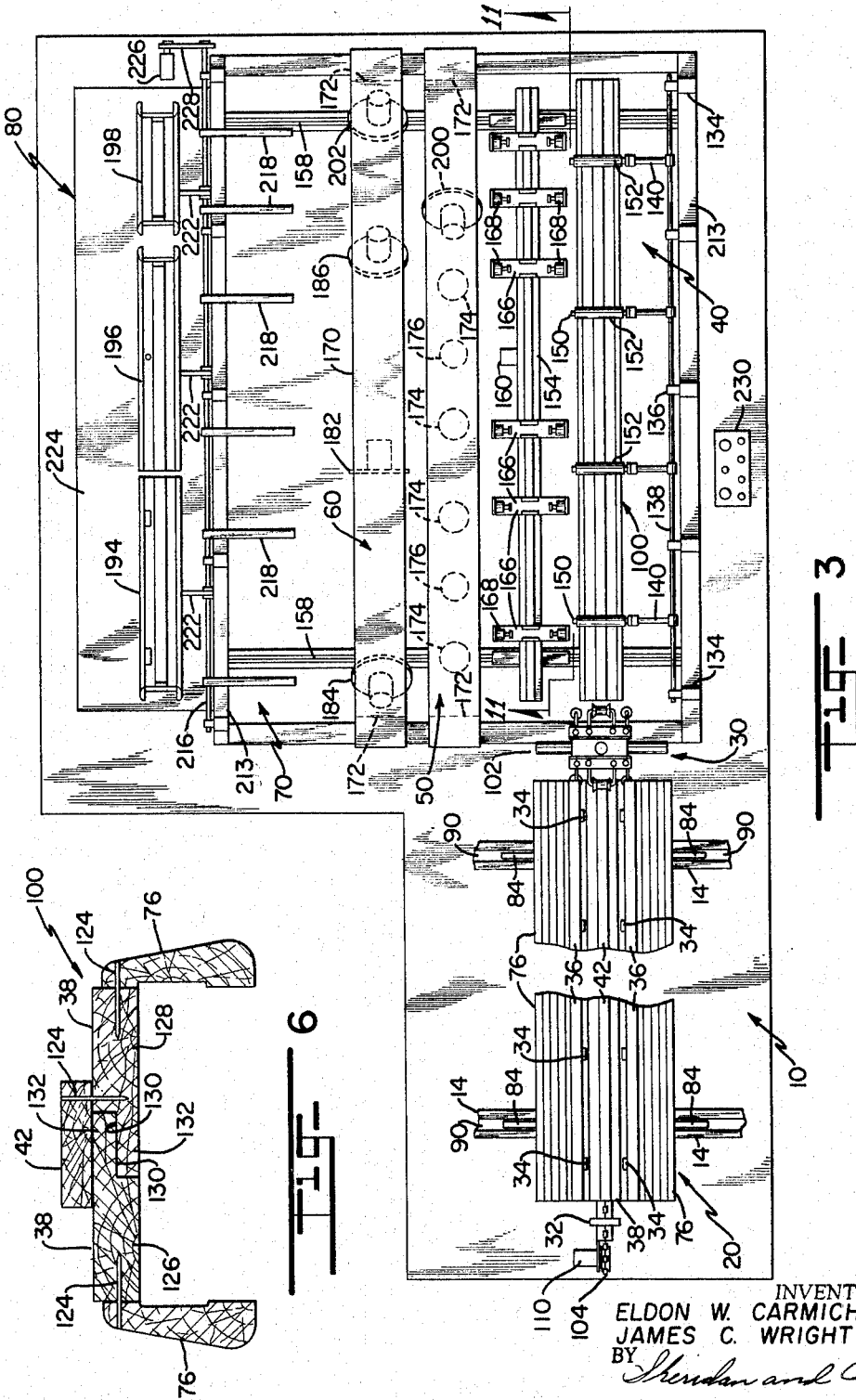
INVENTORS
ELDON W. CARMICHAEL
JAMES C. WRIGHT
BY
ATTORNEYS

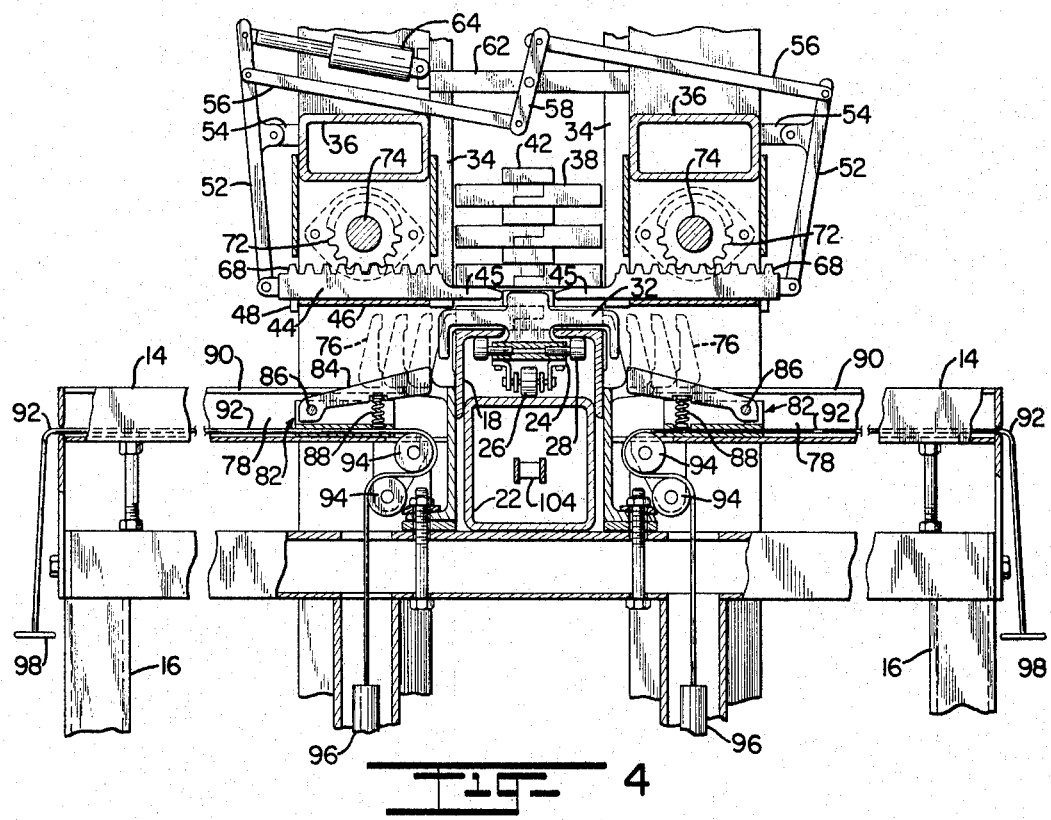
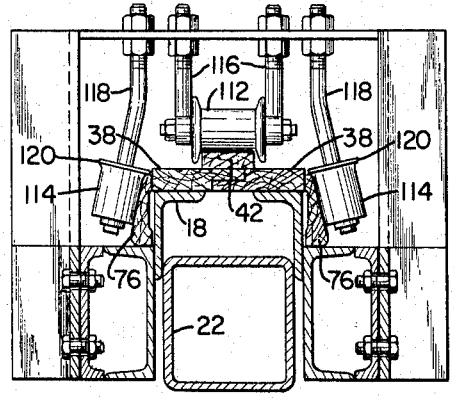

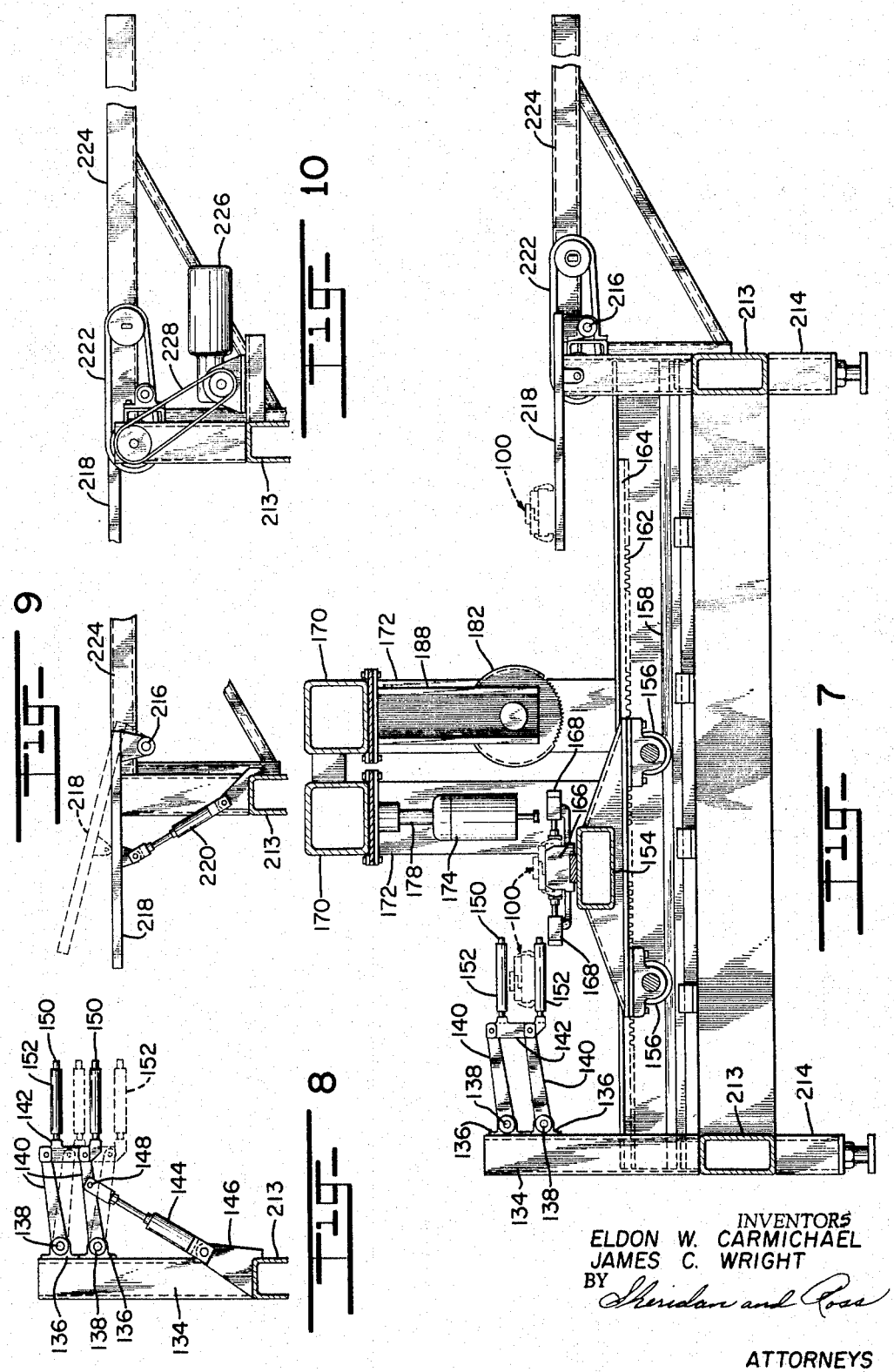

United States Patent Office 3,263,718
Patented August 2, 1966

3,263,718
METHOD AND APPARATUS FOR MANUFACTURING DOOR FRAME COMPONENTS
Eldon W. Carmichael, 32 Bay Drive W., Huntington, Long Island, N.Y., and James C. Wright, Aurora, Colo.; said Wright assignor to said Carmichael
Filed Apr. 23, 1964, Ser. No. 361,972
23 Claims. (Cl. 144—3)

This invention lies in the field of manufacture of door frame components, primarily for use in home construction, and is directed particularly to a method and apparatus for producing a unitized assembly of the elements going to make up a door frame, and for processing the assembly in its unitized condition to make sections of door frames which are finished and matched with a minimum of separate machine operations.

Door frames are assembled from moulding parts which generally include a jamb upon which the door hinges and latch plate are mounted, a stop attached to the jamb against which the door closes, and casing or trim members which surround the sides and top of the door frame. Methods of assembling the moulding parts of a door frame vary in the construction industry from attaching each part upon the rough framed door opening to cutting and trimming all of the parts in a factory and combining them to produce a completely assembled pre-hung door unit. Both on-site and factory-assembled door units are processed and assembled in a similar manner. The vertical jamb members are machined to receive the hinges and strike plate and the various jamb parts are cut to size, mitered, and fastened together. The required stop parts are sized and mitered and are attached to the assembled jamb. The necessary casing or trim parts are sized and mitered and are attached to the assembled jamb and stop combination. Labor costs are, of course, high in the methods presently employed in the industry because of the relatively high proportion of manual work involved. Furthermore, although prior art door frame assembly methods are satisfactory from a quality standpoint when conventional materials are used, the use of improved materials such as plastics, hardboards, and the like, require advanced machines and equipment.

Since, in the conventional practice, each of the elements of each of the sections of the door frame is cut and trimmed to shape individually, great care must be taken to insure the necessary accuracy and this care takes a great deal of expensive time. Any system which will reduce the number of separate sizing and matching operations or which will reduce the total number of machine operations will result in more accurate fitting and also in lower cost.

The present invention overcomes the difficulties previously encountered and makes it possible to produce parts of increased accuracy which fit together more perfectly. In addition, it eliminates the major part of the manual work previously required and greatly reduces the total number of separate machine operations. Because of these improvements the total cost of the manufacturing operations is greatly reduced, and the rate of production of frames per man hour is significantly increased.

In the practice of the invention a group of suitable moulding members are first brought together in one place. The individual members of the group are preferably long enough to furnish the component parts of a complete door frame. The latter is normally about six feet eight inches high and from 28 to 40 inches wide. Hence the individual moulding member is of the order of 17 ft. 6 inches long, which is a standard mill length in the industry. The group includes a jamb member, a stop member, and a pair of casing members. The jamb member may be either the one piece or the two piece type.

These three different types of mouldings are now oriented in a relation corresponding with the relation of like parts in a complete door frame section as it is when assembled in place, with the ends substantially co-terminous. The pieces are now secured together in their oriented relation, preferably with nails or staples or glue to form a right and left hand or two-section assembly one of which comprises a jamb and casing and the other comprising a jamb, casing and stop. This unitized two-section assembly can now be handled and processed as readily as any integral piece of lumber such as a two by four. In fact, it is of approximately the same dimensions.

The unitized assembly is next presented to a forming machine which includes routers and drills, and these tools provide the necessary recesses in the jamb for the door hardware. The assembly is then cut into the standard pieces, normally consisting of two side frame sections and a head frame section, with the appropriate ends squared or mitered. It will be readily apparent that the process produces right and left hand assemblies comprising three finished and matched components with a minimum of machining and cutting operations. Accuracy is eliminated as a problem because the jamb, stop, and casing pieces are already fastened together when the cuts are made, so that they are forced to match.

One presently preferred form of apparatus for practicing the invention comprises a composite structure having a feeding zone, a fastening zone, a loading zone, a machining zone, a severing zone, and an ejection zone. Vertical and lateral magazines adjacent the feeding zone store a plurality of moulding members, and means are provided to intermittently and sequentially supply these members to the feeding zone, where aligning means orient the members exactly as they would be in a finished frame section. The assembly of these members now moves from the feeding zone to the fastening zone, where the parts are fastened together, or unitized, to form right and left-hand sections. Any suitable fastening means may be used but the present machine applies staples. The unitized assembly is now transferred to a loading rack at the loading zone.

A transfer carriage receives the two-section assembly from the loading rack and moves it to the machining zone, where appropriately located and controlled routers and drills recess the jamb member at preselected locations to receive the hinges and striker plate. After the machining is finished the carriage moves the assembly laterally through a set of saws to cut it in the desired pieces. To make all three components at one time a total of five longitudinally spaced saws are used. A first set of three includes a center saw cutting in a vertical plane and two end saws cutting in a diagonal plane. These three saws cut and miter the two side frame sections in one operation and also separate them from the head frame section. The other set, of two saws, is generally longitudinally aligned with the first set and substantially simultaneously cuts and trims the head frame section with its usual mitered ends.

The carriage then transfers the cut sections to the ejection zone where a series of pickup arms remove them from the carriage and pass them on to an accumulator rack. From this rack, the sections may be moved to temporary storage or they may be placed directly into jig frames where the three components of each section may be secured together, and the door may also be attached to make a complete pre-hung unit which may be easily and flexibly mounted to wall sections having any width within a predetermined amount.

Various other advantages and features of novelty will become apparent as the description proceeds in conjunction with the accompanying drawings in which:

FIGURE 1 is a perspective view of an idealized representation of the assembly portion of the machine of this invention;

FIGURES 2 and 2A are similar views, left and right-hand views, respectively, in abbreviated detail of the machining and severing portions of the machine;

FIGURE 3 is a plan view of an idealized representation of the entire machine of the invention, illustrating in abbreviated detail the arrangement of the various parts and the flow of material through the machine;

FIGURE 4 is an end elevational view, partly in section, of the assembly portion of the machine, illustrating the aligning means at the feeding zone;

FIGURE 5 is a detail view in elevation and partly in section, at the fastening portion of the machine, illustrating the means for maintaining the moulding parts in alignment during the fastening operation;

FIGURE 6 is a sectional view through a unitized moulding assembly showing the two sections thereof in abutting engagement and illustrating the placement of the fasteners;

FIGURE 7 is a transverse elevational view through the forming portion of the machine, partly in section and partly in phantom, illustrating the relation of the various zones and the flow of the material through them;

FIGURE 8 is an elevational view, partly in section, of a portion of the loading rack and its servo operator;

FIGURE 9 is a similar view of the pickup device at the ejection zone;

FIGURE 10 is a similar view at the same zone but showing the mechanism for transferring work pieces to the accumulator rack.

Figure 11:
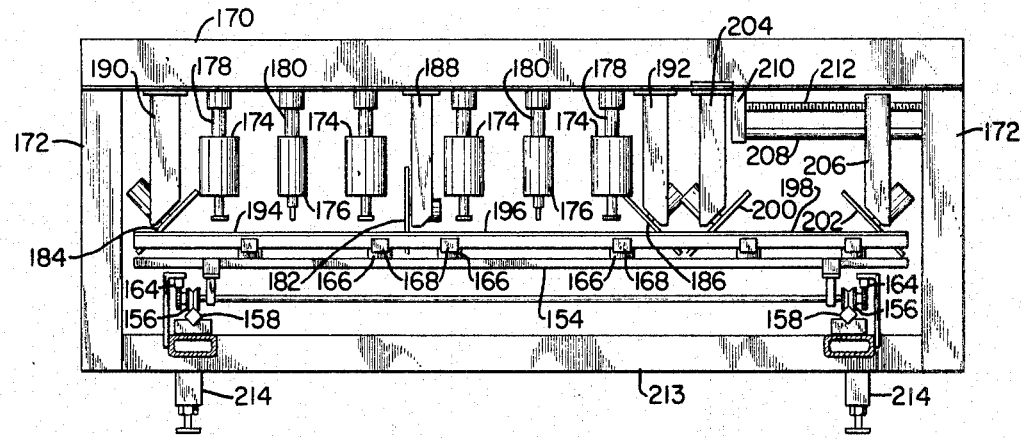
FIGURE 11 is an elevational view taken on line 11—11 of FIGURE 3 and further illustrating the arrangement and relation of the principal parts of the apparatus in the forming portion of the machine.

The basic construction and arrangement of all of the essential parts of one preferred form of apparatus which has been built and operated in accordance with the principles of the invention are illustrated in FIGURES 1, 2, and 3. In addition these figures illustrate the flow of the material through the apparatus, from the stores of individual moulding members at the feeding zone to the unitized, finished and matched door frame sections or components at the ejection zone, ready to be secured together to make complete door frames.

The entire apparatus may be mounted on a platform 10, FIGURE 3, or this may be merely a marked off area in the shop. The various operations take place at a series of successive zones, which may be identified as the feeding zone 20, the fastening zone 30, the loading zone 40, the machining zone 50, the severing zone 60, the ejection zone 70, and the accumulation zone 80. Before going into the structural and mechanical detail of the apparatus, it would be well to recapitulate the steps which constitute the method.

Three types of members go to make up the parts of a door frame section, the jamb, stop, and trim or casing members. The jamb members may be the one piece or two piece type, but in going through the apparatus the latter type is handled, in most regards, in the same way as the former type. The stop member is attached to the front face of one of the jamb members and is secured thereto with one edge spaced from one edge of the jamb member a distance corresponding to the thickness of the door to be hung so that when the door is closed against the stop members in a complete frame it will be flush with the one edge of each of the frame sections. A trim or casing member is attached to one of the side edges of each jamb member and extends rearwardly away from its front face. The casing members hide the junction between the jamb and the rough framing of the doorway, and improve the appearance of the door frame in general.

In practicing the present invention, stores of the three types of moulding are located adjacent the feeding zone 20. These members are long enough to be eventually cut to make the corresponding parts of several door frame sections. Jamb members and stop members are laid horizontally in the direction of length of the feeding zone and are stacked vertically in sets of two jamb members and one stop member in overlying relation thereto. A store of casing members is located at each side of the feeding zone, extending longitudinally and being stacked laterally. A set of parts is moved into the feeding zone, where they are aligned or oriented in exactly the same arrangement as like parts of a finished door frame section.

While maintaining its orientation, the assembly is now moved to and through the fastening zone 30, where fastener drivers apply fasteners of any desired type to the members and fasten them together to produce a two-section unitized assembly that can be handled very readily. From the fastening zone, the unitized assembly moves directly into the loading zone 40, where its general direction of travel is changed from longitudinal to lateral, as it is deposited on a transfer carriage.

The carriage moves the assembly to the machining zone 50, where routers and drills form recesses in the face of the jamb members at appropriate positions to receive the door hardware which is to be attached. Since the assembly is held firmly on the carriage all of this time, the machining operations are very accurate and later difficulty in attaching fittings is completely eliminated.

The carriage next transports the assembly to the severing zone 60 and moves it horizontally and laterally through a set of saws which are so spaced along the length of the assembly and which are operated at such angles to the horizontal that they substantially simultaneously cut each of the two-sections of the assembly in three pieces (two side sections and a head section) of exact predetermined length and with the appropriate ends squared or mitered so that they can be jig-assembled and fastened into a complete door frame.

The cut sub-assemblies, which are still unitized sections, are still firmly held on the carriage in their original locations. They are now carried to the ejection zone 70 where suitable pickup mechanism removes the several sections and passes them on to the accumulation zone 80, whence they may be removed and put in temporary storage or placed in assembly jigs.

The actual structure of the operating machine is very complex and it has been simplified as much as possible in the drawings in order to better illustrate and emphasize those features which constitute or have a direct bearing on the invention. In FIGURES 1 and 3, the apparatus making up the feeding zone and its appurtenances comprises cross members 14 and supporting columns or legs 16. Passing longitudinally through the feeding zone is a support and guide member 18 in the general form of an inverted channel with a slot in the web for the passage of a carrier. As seen in FIGURE 4 it is supported on tubular member 22 which serves as a longitudinal frame member and support for carriage 24, which is provided with rollers 26 and 28 to engage members 18 and 22 to facilitate the movement of the carriage through the passageway. A generally channel shaped pusher 32 is mounted on carriage 24 and serves to move moulding assemblies in a manner to be explained subsequently.

A magazine is provided for the storage of sets of jamb elements and stop elements and it generally includes vertical bars 34 at each side of a central vertical plane and serving as guides for the jamb members, and longitudinal bars 36 uniting the guide bars and forming a rigid framework. In the feeding zone and above it in the vertical magazine are a series of sets of jamb members 38 and stop members 42, each set of jamb members being centrally overlaid by a stop member. It will be noted that the jamb members are of the two piece type with matching tongues and rcesses, which provide a certain amount of adjustment to accommodate varying wall thicknesses.

Guide members 34 are spaced apart jut the width of the jamb members plus necessary clearance, and consequently each of the jab members is properly aligned when it enters the feeding zone by gravity. However, the stop members are free to be displaced from side to side as they move downwardly and it is necessary to align them accurately when they enter the feeding zone. This is accomplished by the use of sets of aligning rods 44. At least two sets are needed, one near each end of the magazine, and it is preferable to provide at least a third set intermediate the length of the magazine.

These rods 44 are slidably mounted in bearings 46 in the main framework and have reduced and tapered leading ends 45 which extend into and retract from the feeding zone from each side of the magazine. Rods 44 are also provided with stop means 48 which contact the outer surface of the framework and limit the penetration of the rods. In FIGURE 4 the rods are at their maximum penetration and their leading ends 45 just touch stop member 42. If the latter is displaced to either side it will be contacted first by the appropriate rod and urged toward proper position. At the completion of the rod penetration there is just enough lateral space to receive the stop member 42 in its aligned attitude.

Rods 44 may be actuated by any suitable mechanism which will extend and retract them equally, or in any desired ratio if the stop member 42 is to be located at other than the central position shown. For purposes of illustration only, a mechanism has been shown which includes levers 52 pivoted at their lower ends to the outer ends of rods 44 and fulcrumed on bosses 54 provided on frame bars 36. Links 56 are pivotally connected to levers 52 adjacent their upper ends and also to a crank member 58 which in turn is pivoted on bracket 62. This linkage is operated by servo motor 64 which has a piston rod pivotally connected to the upper end of the left hand lever 52. Varied rates or amounts of movement may be obtained by varying the lever arms of levers 52 or making one arm of crank 58 longer or shorter than the other.

The several sets of aligning rods 44 must operate in unison, and this may be accomplished in a relatively simple way. Each set is similar and mounted to the frame in the same way. The directly actuated rods shown in FIGURE 4 are provided with rack teeth 68 which engage the teeth of gears 72, the latter being fixed to elongate shafts or rods 74 which extend longitudinally of the frame and are journaled thereto. At each station where a pair of aligning rods 44 is located, the shafts 74 are provided with gears identical to gears 72 shown in FIGURE 4, and these gears engage the corresponding rack teeth on the aligning rods. Therefore, when servo 64 is actuated, all of the aligning rods move together in the same direction and to the same extent.

It will be noted in FIGURE 4 that the leading ends 45 of the aligning rods are located to clear the jamb member in the feeding zone so that it will be free to move longitudinally at the appropriate time. The ends 45 are tapered to engage under the edges of the succeeding jamb member and when they are extended inward to aligning position they hold the jamb member up out of contact with the stop member 42 so that it too can move freely longitudinally of the feeding zone.

Identical, longitudinally extending, horizontal magazines are located at each side of the feeding zone to store supplies of casing members for transfer to the feeding zone as needed. These magazines include a plurality of cross frame members 14 spaced longitudinally of the feeding zone, and the casing members 76 are laid directly on members 14 as shown in FIGURE 4. At least two or three of the cross frame members longitudinally spaced on each side are provided with means to move the casing members laterally toward and into the feeding zone and into proper alignment with the jamb and stop members.

Each of such frame members has a hollow interior serving as a guide 78 for a carriage 82 slidable toward and away from the feeding zone. Pusher 84 is pivotally mounted to the carriage at 86 and its free end is urged upwardly by spring 88, the upward movement being limited by contact of a stop portion of the pivoted end of the pusher with the carriage, as shown. The pusher extends upwardly through and travels longitudinally in slot 90 in the upper wall of frame piece 14, and its free end contacts the outermost of the casing members then stored in the magazine. The pusher assembly is yieldingly urged inwardly toward the feeding zone by a flexible cable 92 trained over pulleys 94 and provided at one end with weight 96. When a fresh supply of casing members is placed in the magazine the pushers 84 are depressed against springs 88 which have a low rate. Cable 92 extends outwardly through frame piece 14 and is provided at its ends with handle 98. The operator pulls on handle 98 and draws the carriage back until the pusher springs up behind the outermost casing member. When the handle is released, weight 96 will again urge the pusher against the casing members.

When the innermost casing members have come to rest as shown in FIGURE 4, the assembly 100 of moulding members is complete and oriented and is ready to be moved on to the stapling machine 102 at zone 30. As can be seen in FIGURE 4, pusher 32 has a cross section similar to that of assembly 100 and is axially in line with it. Carriage 24, on which pusher 32 is mounted, is attached to an endless flexible drive member, shown in FIGURES 1 and 3 as a chain 104, which passes over sprockets 106 and 108. A second pusher and carriage are attached to the chain at an opposite point on its periphery. Drive motor 110 is connected to sprocket 106 and is activated on signal to rotate the sprocket and move the chain and the attached carriage and pusher longitudinally through the feeding zone. As best seen in FIGURES 1 and 3, this movement of the pusher moves assembly 100 axially through the stapling machine and thereafter into loading zone 40.

Figure 1A:
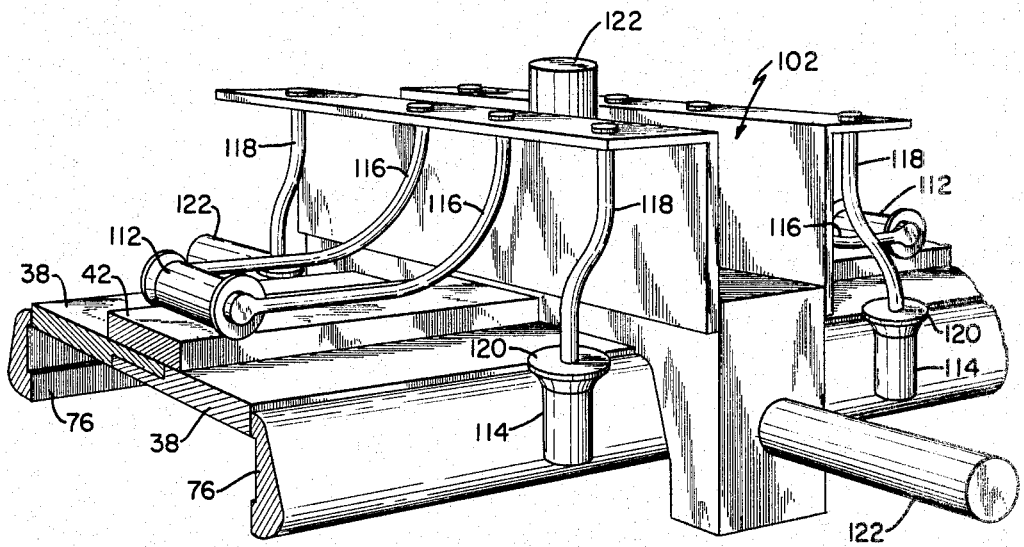
FIGURE 1A is a perspective view of the fastening portion of the machine of this invention.

Additional guide means are shown schematically in FIGURE 1A and in more detail in FIGURE 5. As the assembly 100 moves out of the feeding zone it leaves the guide members which have been described above, but it is essential to maintain the oriented relation of the parts. Therefore, further guide members are provided in the form of upper guide rollers 112 and lateral guide rollers 114 at zone 30 and arranged upstream and downstream of the stapling machine or head 102. The rollers are actually mounted on the general framework of the machine, as illustrated in FIGURE 5, where double-flanged roller 112 is carried by two U-shaped resilient arms 116 and single-flanged rollers 114 are carried by single resilient arms 118. It will be seen that roller 112 orients the stop member 42 and pushes it and jamb member 38 down against guide support 18. Rollers 114 push the casing members 76 against guide support 18, and flanges 120 on rollers 114 serve the dual purpose of centering jamb member 38 and maintaining casing members 76 in their proper relation to it. The two sets of rollers maintain the moulding members oriented while they are being stapled and also guide them accurately toward loading zone 40.

The stapling head 102 is actually an open work structure through which assembly 100 passes, and conventional power staplers 122 are fixedly mounted to the framework and arranged to drive staples into the assembly in predetermined locations. Obviously nailing machines may be used if desired and they would be located and operated in the same way. The staplers are high speed drivers and the assembly moves longitudinally at a relatively slow pace so that the staples can be driven without interrupting the travel of the assembly. The cross sectional view of the assembly 100 in FIGURE 6 shows the location of the three sets of staples 124 which secure both the casing members 76 and the stop member 42 to jamb member 38.

It will be noted that the jamb member in the two piece form shown is made up of two substantially identical halves 126 and 128, each having a recessed corner 130 and tongue 132. Staple 124 secures stop member 42 to jamb half 128, providing a groove into which tongue 132 of jamb half 126 fits snugly enough to retain the parts in assembled relation throughout all of the subsequent operations on the assembly. Thus, at this point the assembly becomes unitized, and all of the forming and cutting operations thereafter are as easy as though it were a solid piece of lumber, like a two by four, and, possibly even more important, a single saw cut will result in perfect matching of all of the pieces which will be used together to make a door frame section.

As the assembly passes through the stapling head and becomes unitized, it progressively enters the loading zone 40, and its forward travel is completed when pusher 32 begins to move downwardly around sprocket 108, FIGURE 1, to begin its return trip. At the loading zone is a generally longitudinally extending structural framework including a plurality of vertical stanchions 134 carrying pivot mounts 136 vertically spaced. Elongate shafts 138 are pivotally supported for rotation in the mounts and have a series of lateral arms 140 rigidly attached to the shafts. The outer ends of the arms are joined by links 142 pivotally connected to the arms to form pin-connected parallelograms as can be readily seen in FIGURES 2 and 8. The parallelograms can be raised and lowered through a predetermined distance as shown in FIGURE 8 by means of a pneumatic or hydraulic servo 144 pivotally mounted to a bracket 146 on the framework and pivotally connected to the lower arm 140 at 148. Since all of the upper and lower arms are fixedly connected to shafts 138 they will all move up and down in unison.

The links 142 are in reality the center portions or bights of U-shaped yokes having arms 150 rigidly connected to and extending outwardly from links 142, each arm being provided with a roller 152, preferably having a soft, resilient covering. The series of yokes, operating together, constitute a loading rack to receive assemblies 100 from the fastening zone and load them on a transfer carriage for subsequent operations. Servo 144 is actuated to raise the rack to the solid line position, FIGURE 8, to receive assemblies from the fastening zone and to lower it to the dotted line position for depositing them on the transfer carriage.

The transfer carriage comprises an elongate beam 154 extending parallel to the loading rack and mounted, by means of wheels 156, on tracks 158 for movement laterally of the machine. It may be powered in any suitable way to drive it and to stop it at selected points. Merely by way of example, a motor 160 may be mounted at any point along the beam and drive a shaft carrying pinions, not shown, engaging with the teeth 162 of racks 164, several of which are spaced along the length of the machine. To receive and hold a moulding assembly for subsequent operations the transfer carriage is provided with a series of spaced mounts 166, the upper contours of which fit neatly within the assemblies as best seen in FIGURE 7. Each mount is provided with a pair of laterally located air operated clamps 168 adapted to firmly grip the assembly when needed.

As soon as the loading rack receives an assembly from the fastening zone, the transfer carriage is moved into a position directly below the rack. The rack is now lowered to the dotted line position indicated in FIGURE 8, which places the assembly squarely on mounts 166. Clamps 168 are now actuated and the assembly is securely gripped. The carriage is now actuated to move to its solid line position shown in FIGURE 7, which places it in the machining zone, and the loading rack is raised to its receiving position, ready for the next assembly.

The machining zone 50 and severing zone 60 are quite close together and the operative elements are preferably supported by a single elongate overhead frame 170 extending the length of the machine and having supporting columns 172 at each end, as best seen in FIGURE 11. Disposed in a row and spaced longitudinally along the edge of frame 170 nearest to the loading zone are a series of machining tools. They are divided into two groups of three, each group consisting of two routers 174 and one drill 176. The routers are carried by variable height supports 178 and the drills are carried by variable height supports 180. The routers furthermore are mounted for controlled pattern movement of the cutting tool in a horizontal plane but the mechanics of these movements are not a part of the present invention, and details have been omitted for clarity. Normally the routers of one group and the drill of the other group are used in a single machining operation.

The two routers produce recesses for the hinge plates in the jamb of that portion of the assembly which will be one of the vertical or side frame sections and the drill produces a recess for the door latch bolt in the jamb of that portion of the assembly which will be the other vertical or side frame section. If this produces recesses for left-hand door hardware, then the use of the other drill and the other routers will properly process the assembly for right-hand door hardware. The advantage of the dual sets of cutting tools is that the moulding assemblies can always be moved through the machine in the same way, with the machine work applied to the near edge of the jamb, and the change from right-hand to left-hand can be made simply by actuating alternate sets of tools. Thus the tools are always located at the exact point of proper adjustment and are always ready for use.

FIGURE 7 illustrates the situation where the transfer carriage has brought the assembly 100 almost to the machining zone 50. Clamps 168 grip the assembly tightly and hold it firmly on mounts 166 against any relative vertical or lateral movement. Router 174 is lowered until its cutting tool has overlapped the jamb vertically by the amount of the desired depth of cut to make the recess for a hinge plate. The cutting tool and/or the entire router is now moved toward the jamb, and the tool pursues a cutting pattern in a horizontal plane which will remove the desired material. It is then retracted laterally until it clears the work and is then retracted vertically sufficiently to allow the assembly to pass under it. During the described operation of the router, the drill, not shown, has been lowered directly vertically at another part of the length of the assembly to produce a recess for the door latch bolt.

When the cutting tools have been raised to provide adequate clearance the carriage is actuated to move slowly but continuously through the severing zone 60 to the ejection zone 70. In the severing zone are located a plurality of saws longitudinally spaced along the length of frame 170. In the form illustrated, there are five saws in all, which may be considered as divided into a group of three and a group of two. The first group, best seen in FIGURE 11, includes a saw 182 cutting in a vertical plane and saws 184 and 186 cutting in inclined planes. These saws are carried on brackets 188, 190 and 192 respectively, attached to frame 170, and may be considered as held in fixed position, although they normally have provision for making fine adjustments after which they are locked in place. Each saw is provided with its own individual motor.

These three saws are considered as a set because saw 182 makes a straight cross cut dividing the assembly 100 into parts 194 and 196 and squares the ends to serve as the bottoms of the two side sections, saw 184 miters the free end of section 194, and saw 186 cuts piece 198 away from piece 196 and simultaneously miters the end of 196 so that the two side sections are now complete and mitered, ready to be mated to a head section. Saws 200 and 202 constitute the set of two. Saw 200 is directly and rigidly mounted to frame 170 by bracket 204, while bracket 206 for saw 202 is mounted on a longitudinally extending guide rod 208 mounted at one end in column 172 and at the other end in bracket 210. Rotatable threaded adjustment screw 212 is threaded through the upper part of bracket 206 and moves the bracket longitudinally to adjust the distance between saws 200 and 202. These two saws miter the ends of piece 198 which was cut off from 196 and it now becomes a complete sized and mitered head section ready to be mated to pieces 194 and 196.

Saws 186 and 200 may be arranged with either one slightly behind the other in order to make their two cuts as close together as possible and save material. All of the saws except saw 202 are fixed in their longitudinal position because normally all home door frames are a standard height of six feet eight inches inside measurement. On the other hand, the widths of door frames vary from 28 inches or less to 40 inches or more, and adjustment of saw 202 makes it possible to set the machine for any width at a moment's notice.

When assembly 100 has completed its passage through the severing zone it has been divided into pieces 194, 196, and 198, and each of these pieces is finished and matched to be put together in a door frame jig with no further cutting, trimming, or fitting of any kind necessary. There are enough mounts 166 on the transfer carriage so that there will be at least two mounts for each of the three pieces, thus insuring that they will not be displaced during the severing operation.

At the ejection zone 70 there is a longitudinally extending structural framework having at least one horizontal member 213 and vertical columns or legs 214. An elongate shaft 216 is pivotally carried by the framework and a series of pickup arms 218 are fixedly secured to it in any suitable way. An air piston-cylinder servo 220 is pivotally mounted to the framework and pivotally connected to an arm 218, and can be actuated to raise and lower the pickup arms as desired, as indicated in FIGURE 9. When the transfer carriage moves into the ejection zone, arms 218 are horizontal and just below the bottoms of the pieces of assembly 100. Air clamps 168 are deactivated and arms 218 are raised to an angle as indicated in FIGURE 9 which causes the pieces to slide to the right as seen in this figure. A conveyor belt 222 carried by the framework completes the transfer of the finished pieces to the accumulator rack or table 224, from which the pieces may be removed for storage or for placing in an assembly jig. Belt 222 is actuated by motor 226, to which it is connected by a drive belt 228.

The entire operation is controlled from console 230, FIGURE 3, and may be automatic or semi-automatic as desired. The operation is classed as continuous or automatic although to some extent it is step by step. In one mode of operation the pusher system in the feeding zone halts after pushing an assembly through the fastening zone and into the loading zone. When the new assembly is oriented, the pusher is re-activated. Arrival of the transfer carriage in the loading zones causes the loading rack to lower and deposit the assembly on the mounts. The other steps are all sequenced in the same general way. The present machine utilizes sequential switching to perform several steps and then halt. The operator then manually reactivates by pushing the appropriate button on the console to perform the next series of steps, and so on. The details of the control mechanism have not been shown since they are conventional. Of course the machine can be made fully automatic if desired, with punched tape controls or other known systems. However, since the operator must be present at all times to observe the performance of the machine, it has been found preferable to use a semi-automatic system with the operator in adequate control of all of the steps of the entire process.

It is obvious that a similar machine can be made on a smaller scale to utilize the advantages of the unitized assembly in making single pieces such as piece 194, but the advantages of producing all three sections at the same time and in the same time are so great that a single piece machine is not considered practical.

The assembling portion of the machine has considerable utility in itself, because it can be used to unitize assemblies of moulding pieces which can be stored in their uncut lengths or even sent out to construction jobs in uncut lengths where, for any reason, the door frames are to be of non-standard sizes.

It will be apparent to those skilled in the art that various changes and modifications may be made in the construction and operation of the parts as disclosed herein without departing from the spirit of the invention and it is intended that all such changes and modifications shall be embraced within the scope of the following claims.

We claim:

1. Apparatus for producing finished, matched door frame sections, comprising: an elongate feeding zone; a longitudinally and vertically extending magazine arranged above said feeding zone to store a plurality of sets of jamb and stop members and to supply them successively to said feeding zone; a pair of longitudinally and laterally extending magazines, one at each side of said feeding zone, adapted to supply pairs of casing members to said feeding zone; means at said feeding zone to orient said members into an assembly in a relation corresponding to the relation of like members in a completed door frame section; a fastening zone; means travel-through said feeding zone to move said assembly longitudinally to said fastening zone; means at said fastening zone to fasten the members together and unitize the assembly; a machining zone; a severing zone; means to move said assembly successively to said zones; and means at said zones to machine the assembly for the reception of door hardware and to divide it into subassemblies constituting unitized sections of a door frame.

2. Apparatus for producing finished, matched door frame sections, comprising: a feeding zone; means to supply a length of jamb means and a length of stop means to said feeding zone; means to supply a pair of lengths of casing means to said feeding zone; means to orient all of said lengths into an assembly in a relation corresponding to the relation of like parts in a completed door frame section; a fastening zone; a machining zone; a severing zone; and an ejection zone; means to transfer said assembly successively from said feeding zone to said fastening, machining, severing, and ejection zones; means at said fastening zone to fasten said lengths together to unitize the assembly; means at said machining zone to machine the jamb means for the reception of door hardware; and means at said severing zone to divide the assembly into unitized sections adapted to be secured to each other to provide a complete door frame.

3. Apparatus as claimed in claim 1; said means to transfer said assembly being arranged to move said assembly continuously through said fastening zone; and said fastening means being arranged to fasten successive portions of said assembly as they pass through said fastening zone.

4. Apparatus as claimed in claim 1; the means at said severing zone being arranged to cut said assembly to exact lengths and with the appropriate ends mitered to form two side frame sections and one head section finished and matched for assembly into a complete door frame.

5. Apparatus for producing finished, matched door frame sections, comprising: a feeding zone; means to supply a length of jamb means and a length of stop means to said feeding zone; means to supply a pair of lengths of casing means to said feeding zone; means to orient all of said lengths into a relation corresponding to the relation of like parts in a completed door frame section; means to fasten said oriented jamb, stop, and casing means together to constitute a unitized assembly; means to machine selected portions of said jamb means for the reception of door hardware; and means to cut and shape said assembly to produce at least one unitized door frame section adapted for assembly with other sections with no further machine operations.

6. Apparatus as claimed in claim 5; said last mentioned means comprising means to cut said assembly into three unitized sub-assemblies and shape them to constitute two side frame sections and a head frame section adapted to be secured to each other to provide a complete door frame.

7. Apparatus for producing a unitized assembly of moulding members for use in the manufacture of door frame sections, comprising: an elongate feeding zone to receive lengths of moulding members; an elongate vertical magazine located above said feeding zone to store sets of jamb members and stop members and to supply them successively to the feeding zone; a pair of elongate horizontal magazines located laterally of said feeding zone to store casing members and to supply them in pairs to said feeding zone; means at said feeding zone to orient said members into an assembly in a relation corresponding to the relation of like parts in a completed door frame section; a fastening zone; means to move said assembly to said fastening zone; and means at said fastening zone to fasten said members together to unitize the assembly.

8. Apparatus as claimed in claim 7; said vertical magazine storing a plurality of sets of jamb members and stop members, the stop member of each set lying on top of the jamb member and adapted to be fed to the feeding zone by gravity; vertical guide members in said magazine laterally spaced a distance equal to the width of said jamb members to maintain them in alignment; and the orienting means including a plurality of sets of stop alignment members at the juncture of said magazine and said feeding zone; means to move the members of each set of alignment members between the bottom jamb member and the succeeding jamb member and contact the stop member to orient it exactly in the position in which it is to be fastened; said alignment members further serving to support the succeeding members while the assembly is being transferred out of the feeding zone; said alignment members being retractable to allow the succeeding jamb member and stop member to enter the feeding zone.

9. Apparatus as claimed in claim 7; said means to move said assembly comprising a pusher member adapted to contact one end of said assembly and push it longitudinally through said feeder zone and through said fastening zone.

10. Apparatus as claimed in claim 9; said fastening means being arranged to fasten successive portions of said assembly together as they pass through the fastening zone.

11. Apparatus as claimed in claim 7; said means to move said assembly comprising an endless flexible drive member having a forward path of travel through said feeding zone and a rearward path of travel below said feeding zone; and a pair of pusher members attached to said drive member at equally spaced points about its periphery; said pusher members being adapted to alternately contact successive assemblies to push them lengthwise through and out of the feeder zone.

12. Apparatus as claimed in claim 7; and a set of pressure rollers located at the fastening zone to contact the top and sides of said assembly and maintain it in properly oriented relation during the fastening operation.

13. Apparatus as claimed in claim 7; each of said horizontal magazines storing a plurality of casing members and including a horizontal rack to support said members side by side and parallel to said feeding zone; and means movably mounted on said rack to yieldably urge said casing members laterally toward said feeding zone for successive assembly with said other moulding members.

14. Apparatus as claimed in claim 13; each rack carrying a plurality of guide tracks extending horizontally and laterally of the feeding zone; said last mentioned means including a carriage slidable in each track below the horizontal support surface of the rack; means to yieldably urge it toward the feeding zone; a pusher movably mounted on each carriage for limited vertical movement and resiliently urged upwardly to project above the support surface for contact with the outermost casing member; the pusher yielding downward for passage of a fresh supply of casing members.

15. An automatic forming machine for sequentially and continuously forming finished, matched, door frame sections from unitized assemblies of appropriate moulding members, comprising: a loading zone; a matching zone; a severing zone; and an ejection zone; transfer means operative to repetitively accept successive unitized moulding assemblies at said loading zone, and to transfer said assemblies sequentially to said machining zone, severing zone and ejection zone; means at said machining zone to recess said assemblies at preselected positions for the reception of door hardware; and means at said severing zone to cut said assemblies and shape them to constitute finished, matched, components of a complete door frame.

16. A machine as claimed in claim 15; said transfer means including a transfer carriage having mounts for receiving said assemblies; and a loading rack movable between one position in which it is adapted to receive an assembly from an external source and another position in which it is adapted to deposit said assembly on the mounts on said transfer carriage.

17. A machine as claimed in claim 16; and clamping means to clamp said assembly securely to said mounts to prevent displacement during machining and severing operations.

18. An automatic forming machine for sequentially and continuously forming finished, matched, door frame sections from unitized assemblies of appropriate moulding members, comprising: an elongate loading zone; an elongate machining zone; an elongate severing zone; and an elongate ejection zone; said machining and severing zones being closely adjacent and parallel; a supporting framework generally common to and coextensive with the latter two zones; a series of aligned and longitudinally spaced cutting tools supported by said framework and arranged to contact each assembly sequentially and for recesses therein for the reception of door hardware; a series of generally aligned and longitudinally spaced saws supported by said framework and arranged to contact each assembly sequentially and cut it into three sections of the proper length and with properly shaped ends to constitute two side sections and a head section of a complete door frame; an elongate framework at said loading zone spaced laterally from and extending generally parallel to said supporting framework; a loading rack extending along said loading zone; an elongate framework at said ejection zone spaced laterally in the opposite direction from said supporting framework and also extending generally parallel thereto; an accumulator rack extending along said ejection zone; guide tracks extending laterally between said loading zone and said ejection zone and passing through said other two zones; and a transfer carriage mounted on said guide tracks and movable therealong to accept an assembly at said loading zone and transfer it sequentially to each of the other zones.

19. An automatic forming machine as claimed in claim 18; said series of saws comprising at least a set of three saws, the center saw cutting in a vertical plane and the end saws cutting at preset angles to produce two side frame sections of identical height with squared lower ends and mitered upper ends.

20. An automatic forming machine as claimed in claim 19; including a further set of two saws, both cutting at preset angles to produce from the remainder of the assembly a head frame section of predetermined length and mitered at both ends; one of said saws being closely adjacent one of said end saws of the first set to obtain maximum utilization of the material of said assembly.

21. An automatic forming machine as claimed in claim 20; the position of the second of said set of two saws being longitudinally adjustable along said supporting framework to produce head frame sections of various lengths.

22. An automatic forming machine as claimed in claim 18; said loading rack comprising a series of longitudinally spaced yokes extending laterally of the machine; rollers on said yokes to receive assemblies transferred into said rack in a direction longitudinal of the machine; said yokes having an upper position for receiving said assemblies and a lower position for depositing them on said transfer carriage; and means for moving said yokes between said positions.

23. An automatic forming machine as claimed in claim 18; and a series of longitudinally spaced pickup arms pivotally mounted on the framework at said ejection zone; the free ends of said arms extending inwardly toward the center of the machine and at a level below the assembly; and means to tilt said arms upwardly when the transfer carriage reaches the ejection zone to lift the severed sections of said assembly off the transfer carriage and move them on to the accumulator rack.

No references cited.

WILLIAM W. DYER, JR., *Primary Examiner.*

R. J. ZLOTNIK, *Assistant Examiner.*